United States Patent
Abhyankar et al.

(10) Patent No.: US 9,193,509 B2
(45) Date of Patent: Nov. 24, 2015

(54) DUAL BARRIER LAMINATE STRUCTURE

(75) Inventors: Chandrashekhar Ramchandra Abhyankar, Mumbai (IN); Mrinal Kanti Banerjee, Mumbai (IN)

(73) Assignee: ESSEL PROPACK LIMITED, Mumbai (IN)

( * ) Notice: Subject to any disclaimer, the term of this patent is extended or adjusted under 35 U.S.C. 154(b) by 11 days.

(21) Appl. No.: 14/125,817

(22) PCT Filed: Jun. 14, 2012

(86) PCT No.: PCT/IN2012/000419
§ 371 (c)(1),
(2), (4) Date: Dec. 12, 2013

(87) PCT Pub. No.: WO2013/051016
PCT Pub. Date: Apr. 11, 2013

(65) Prior Publication Data
US 2014/0124404 A1 May 8, 2014

(30) Foreign Application Priority Data

Jun. 14, 2011 (IN) .......................... 1730/MUM/2011

(51) Int. Cl.
| | |
|---|---|
| *B65D 65/40* | (2006.01) |
| *B32B 15/08* | (2006.01) |
| *B32B 27/08* | (2006.01) |
| *B32B 27/30* | (2006.01) |
| *B32B 27/32* | (2006.01) |
| *B32B 27/34* | (2006.01) |

(52) U.S. Cl.
CPC ............... *B65D 65/40* (2013.01); *B32B 15/08* (2013.01); *B32B 27/08* (2013.01); *B32B 27/306* (2013.01); *B32B 27/32* (2013.01); *B32B 27/34* (2013.01); *B32B 2307/7242* (2013.01); *B32B 2307/7244* (2013.01); *B32B 2307/7246* (2013.01); *B32B 2439/80* (2013.01); *Y10T 428/31681* (2015.04); *Y10T 428/31746* (2015.04); *Y10T 428/31757* (2015.04)

(58) Field of Classification Search
CPC ........ B65D 65/40; B32B 15/08; B32B 27/08; B32B 27/306; B32B 27/32; B32B 27/34; B32B 2307/7242; B32B 2307/7244; B32B 2307/7246; B32B 2439/80; Y10T 428/31746; Y10T 428/31681; Y10T 428/31757
USPC .................. 206/524.2; 428/476.9, 476.1, 458
See application file for complete search history.

(56) References Cited

U.S. PATENT DOCUMENTS

| | | |
|---|---|---|
| 4,539,259 A | 9/1985 | Zuscik |
| 4,615,926 A | 10/1986 | Hsu et al. |
| 4,729,926 A | 3/1988 | Koteles |
| 5,547,765 A | 8/1996 | Degrassi et al. |
| 6,068,933 A | 5/2000 | Shepard et al. |
| 6,902,817 B2 | 6/2005 | Bowen et al. |
| 2003/0180487 A1 | 9/2003 | Reighard et al. |
| 2006/0177681 A1 | 8/2006 | Breese et al. |
| 2008/0118749 A1 | 5/2008 | Aubee et al. |
| 2010/0266828 A1 | 10/2010 | Banerjee |
| 2010/0272869 A1 | 10/2010 | Bekele |
| 2011/0027428 A1 | 2/2011 | Bekele |

OTHER PUBLICATIONS

International Search Report on Patentability for PCT/IN2012/000419 dated Apr. 29, 2013.

*Primary Examiner* — Michael C Miggins
(74) *Attorney, Agent, or Firm* — Baker & Hostetler LLP

(57) ABSTRACT

The present disclosure relates to a dual barrier laminate structure, particularly suitable for aggressive or moisture containing products. The present disclosure also relates to a plastic based laminate (PBL) or an aluminum based laminate (ABL) comprising the said dual barrier laminate.

18 Claims, 3 Drawing Sheets

DUAL BARRIER LAMINATE STRUCTURE

CROSS-REFERENCE TO RELATED APPLICATION

This application is filed under the provisions of 35 U.S.C. §371 and claims priority to International Patent Application No. PCT/IN2012/000419, filed on Jun. 14, 2012, which, in turn, claims priority to the Priority Patent Application No. 1730/MUM/2011, filed on Jun. 14, 2011. Both applications are incorporated herein in their entirety.

TECHNICAL FIELD

The present disclosure relates to a dual barrier laminate structure. In particular, the dual barrier laminate is for manufacturing packaging tubes of aggressive or moisture containing product, such as liniment and/or ointment.

BACKGROUND

Polymeric films are widely used in the packaging field for the packaging of products, especially pharmaceutical or food products. Films used for the packaging of food generally contain multiple layers, in which each layer adds certain desired physical or chemical properties to the completed film. For example, a "barrier" layer may serve to protect the packaged product from physical stresses caused by the normal handling of the product during packaging, shipping, or during commercialization. In addition, a heat sealant layer may be utilized to bond films together to form packages for products, such as pharmaceutical or food products. Further, the combination of layers may allow for a film that has favorable physical properties, such as, for example, strength, stiffness, abrasion and chemical resistance.

One such layer that may be utilized as a barrier layer and to increase the toughness of films made therefrom is a layer comprising polyamide. Polyamide is a high molecular weight polymer having amide linkages along the molecular chain structure. Nylon polyamides, which are synthetic polyamides, have favorable physical properties of high strength, stiffness abrasion and chemical resistance.

Aggressive products, for example, moisture-containing pharmaceutical products, such as liniment, are often packaged in a polyamide, such as nylon, film as the outer layer of a package, which offers a dimensionally stable print surface as well as barrier and flex-crack resistance. The combination of a polymeric coating applied to a nylon film, for example, a biaxially oriented nylon (BON) film, results in a structure that is softer and more formable than typical film laminations.

It is, of course, generally known to provide multilayer polymeric films that may have high strength, stiffness, abrasion resistance and/or chemical. Many such films may have a barrier layer of ethylene-vinyl alcohol copolymer (EVOH) sandwiched by layers comprising a nylon polyamide. In some cases, these layers do not gel together, so a multilayer film would delaminate. To overcome this issue, small layers of special adhesive resins, which are generally known as tie layers, are used in between the nylon and EVOH. For example, a five-layer film comprises five different layers of film such as Nylon//Tie//EVOH//Tie//Nylon.

U.S. Pat. No. 6,068,933 discloses a clear multilayer polymeric film of a structure, including a core layer of ethylene-vinyl alcohol copolymer (EVOH) sandwiched between two nylon layers, or two nylon inner layers and a nylon outer layer, represents an improved multilayer thermoformable polymeric layer. U.S. Pat. No. 4,615,926 discloses a multiple layer packaging film, packages made therefrom and a method of opening the packages. The packaging film has the following layer structure:

Ionomer//tie layer//ethylene vinyl alcohol (EVOH)//adhesive layer//polyethylene layer//tie layer//polypropylene.

U.S. Pat. No. 6,902,817 discloses a permeable membrane for volatile substances, such as a room air fragrance and other aromatic products, that satisfies the need for a permeable membrane which provides greater controlled release and increased permeation for a broad range of fragrances. US Patent Application 2010/0272869 discloses a coextruded multilayer film comprising a core layer including an ethylene vinyl alcohol copolymer; two polyamide layers; a first outer layer; a second outer layer; and two tie layers each adhering a polyamide layer to a respective outer layer. U.S. Pat. No. 4,729,926 discloses a polymeric film having the following structure:

Tie layer//nylon layer//ethylene-vinyl alcohol copolymer (EVOH) layer//nylon layer//low density polyethylene layer//primer layer//outer layer.

Unfortunately, mottling can occur when such nylon is used in packages for moisture containing products, for example, liniment. Moisture from the products diffuses through the package into the nylon layer. The nylon absorbs the water, creating the mottling and swelling in size to create a gap between the package and the products. Such mottling may appear over time, such as after the package is shipped for sale. Accordingly, absorption of water from moisture containing products results in a poor package appearance and increased potential for product mold, because mold is better able to grow when there is air in contact with a moisture containing product. Indeed, the tightness of a package around a moisture containing product may be more critical for preventing mold growth than the extent of the oxygen barrier characteristics of a package.

SUMMARY

The present disclosure provides a dual barrier laminate structure, particularly suitable for aggressive or moisture containing products.

In an aspect of the present disclosure, the dual barrier laminate structure comprising: an outer polyethylene (PE) layer; a first adhesive layer; a first ethylene vinyl alcohol copolymer (EVOH) barrier layer, an aliphatic polyamide layer; a second ethylene vinyl alcohol copolymer (EVOH) barrier layer; a second adhesive layer; and an inner polyethylene (PE) layer.

Another aspect of the present disclosure is a Plastic based laminate (PBL) or an Aluminum based laminate (ABL) comprising the dual barrier laminate of the present disclosure.

These and other features, aspects, and advantages of the present subject matter will become better understood with reference to the following description. This summary is provided to introduce a selection of concepts in a simplified form. This summary is not intended to identify key features or essential features of the present subject matter, nor is it intended to be used to limit the scope of the present subject matter.

BRIEF DESCRIPTION OF THE DRAWING

The above and other features, aspects, and advantages of the subject matter will be better understood with regard to the following description, appended claims, and accompanying drawings where:

DETAILED DESCRIPTION

Figure 1:
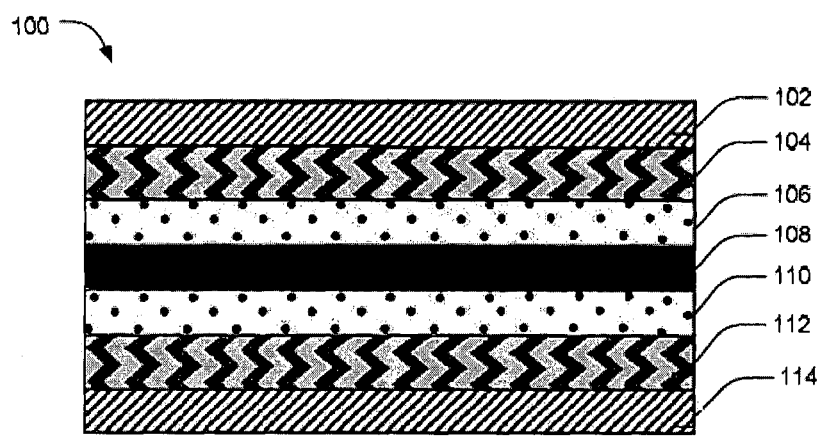
FIG. 1 illustrates a cross-section of the dual barrier laminate structure comprising seven layers.

The present disclosure provides a dual barrier polymeric laminate structure and packages made therefrom. More specifically, the present subject matter suggests a dual barrier layer in a laminate structure for packaging of very aggressive or moisture containing products, such as liniment and/or ointment.

The present disclosure further provides a dual barrier laminate comprising: an outer polyethylene (PE) layer; a first adhesive layer; a first ethylene vinyl alcohol copolymer (EVOH) barrier layer, an aliphatic polyamide layer; a second ethylene vinyl alcohol copolymer (EVOH) barrier layer; a second adhesive layer; and an inner polyethylene (PE) layer.

For packaging of pharmaceutical products, the laminates have to protect the contents of the pharmaceutical products against moisture and atmospheric gases and have to preserve the properties of the contents of the pharmaceutical products. To achieve the above mentioned objectives, the laminates are provided with a barrier layer along with the polymer layers. This barrier layer usually serves as a core layer and is sandwiched between the polymer layers of the laminates. Based on the type of barrier layer used, the laminates are classified into aluminum barrier laminates (ABL) and plastic barrier laminates (PBL). In addition, for the purpose of saving in costs and improvement of quality of the packaging material, the plastic barrier laminates (PBL) are considered over the aluminum barrier laminates (ABL) in this type of applications, where oxygen resistance and intake is of not much importance. However for very aggressive products and where air sucks back in the container to be prevented Aluminum based laminates (ABL) are preferred over plastic based laminates (PBL).

According to the present disclosure an aliphatic polyamide layer is sandwiched between the ethylene vinyl alcohol copolymer (EVOH) layers. The ethylene vinyl alcohol copolymer (EVOH) polymer is a superior oxygen barrier and also absorbs less moisture than a polyamide. Thus, a dual barrier polymeric laminate structure is disclosed according to the present disclosure.

In the overall laminate structure, the outer and inner layers are used as waterproof layers to contain moisture containing products, such as liniment and/or ointment, and to protect interior polymers from moisture. Furthermore, the outer layer also serves as a printing layer.

In another embodiment, the polyethylene layer is selected from 75% to 95% (w/w) linear low density polyethylene (LLDPE), preferably 90% (w/w) linear low density polyethylene (LLDPE) and 5% to 20% (w/w) low density polyethylene (LDPE), preferably 10% (w/w) low density polyethylene (LDPE).

The low density polyethylene (LDPE) used in the present disclosure is advantageously of density around 0.918 g/cc to 0.935 g/cc, preferably 0.933 g/cc and the density of the linear low density polyethylene (LLDPE) used is advantageously around 0.918 g/cc to 0.940 g/cc, preferably 0.927 g/cc. The low density polyethylene (LDPE) and linear low density polyethylene (LLPDE) used can be the commercially available polymers, such as, Exxon Mobil's "LD-151BW" and "Exceed 1327CA", Hexane based r metallocene LLDPE.

Further, the linear low density polyethylene (LLDPE) polymer can be selected from C8 (Octane based linear low density polyethylene (LLDPE)) such as Dow's "5056 G", "2045", "2038", "2740" Grades or metallocene polyethylene polymer such as Exxon Mobils "Exceed" family (1018 CA, 1327 CA), "Enable 3505" polymers from metallocene grades, Dow's "Elite" grade Metallocene linear low density polyethylene (LLDPE) family. The similar Octane or Hexane based linear low density polyethylene (LLDPE) polymer grades from other polymer manufacturers such as Mitsui Chemicals, C6 (Hexene based linear low density polyethylene (LLDPE))—"Ulzex" grade or (hexene based) metallocene "4020 L Evolue" grades etc., also can be used.

In an embodiment, the outer polyethylene (PE) layer is multi-layered. Moreover, the outer polyethylene (PE) layer also allows heat sealability of the laminate structure and thus eliminates the possibility of cracks and tears, which occur during conventional multiple, fold sealing of the tubes having aluminum barrier laminates (ABL).

Adhesive or tie layers may adhere together various layers of the multi-layer laminate structure. Material for tie or adhesive layer is selected based on the composition of the outer layer and the next layer. In another embodiment, the adhesive layer is made up of maleic anhydride modified polyethylene copolymer selected from ethylene vinyl acetate (EVA)-based adhesive or linear low density polyethylene (LLDPE)-based adhesive. The tie or adhesive layer may alternatively comprise any of the various other polymeric adhesives commonly used in the art of making multi-layer laminates.

The barrier layer comprises the ethylene vinyl alcohol copolymer (EVOH) layer, which may be configured in the laminate structures as either an oxygen barrier or moisture barrier or both. The ethylene vinyl alcohol copolymer (EVOH) layer is placed between the polyamide layer and the outer layer or inner layer, respectively. Conventional aluminum barrier layer provides effective barrier properties against atmospheric gases; however, on the other hand, ethylene vinyl alcohol copolymer (EVOH) layer is employed to provide barrier against air as well as moisture and also exhibits good aroma-preservation property. Furthermore, a packaging material containing ethylene vinyl alcohol copolymer (EVOH) layer can easily be printed with high-quality graphics without special surface treatment. This enhances the overall appearance of the packaging material. Moreover, the ethylene vinyl alcohol copolymer (EVOH) layer offers very high resistance to hydrocarbons, oils and organic solvents, when ethylene vinyl alcohol copolymer (EVOH) layer is implemented in multi-layer laminate structure. The laminate structure having ethylene vinyl alcohol copolymer (EVOH) layer has excellent UV (ultra violet)-resistance. Even when the laminate structure having ethylene vinyl alcohol copolymer (EVOH) layer is exposed to outdoor conditions, the polymeric laminate structure retains its color. It will not turn yellow or become opaque. Mechanical changes are minimal, demonstrating an overall high resistance to weather effects.

An aliphatic polyamide layer is provided as a core layer in the laminate configured according to the present disclosure. The aliphatic polyamide layer is sandwiched between the ethylene vinyl alcohol copolymer (EVOH) layers. Further, the aliphatic polyamide layer is usually provided for mechanical strength and thermal resistance to improve the overall distribution barrier resistance and bulge resistance of the laminate. The aliphatic polyamide layer can include, but not limited to, nylon 6, nylon 6/66, nylon 6/9, nylon 6/10, nylon 6-10, nylon 11, nylon 12, amorphous nylons, MXD-6, nylon nano-composites, nylon combined with other inorganic fillers.

An aliphatic polyamide denotes a polyamide that is compatible with the aromatic polyamide contained in the barrier layer. The aliphatic polyamide is present in an amount ranging from 0% to 50% on the weight of the total polyamide content in the barrier layer.

In an embodiment, the aliphatic polyamide layer is selected from poly(hexamethylene adipamide) (nylon 66), poly(hexamethylene azelaamide) (nylon 69), poly(hexamethylene sebacamide) (nylon 610), poly(hexamethylene dodecanoamide) (nylon 612), poly(dodecamethylene dodecanoamide) (nylon 1212) and their copolymers. Examples of polyamides obtainable by (and preferably, obtained by) the auto-polycondensation reaction of an amino carboxylic acid and/or a lactam are the polycaprolactame (nylon 6), the polycaproamide and the poly(11-amino-undecano-amide).

Notably commercially available aliphatic polyamide such as "Ultramid B40" or "Ultramid B33 L" can be used in accordance with the present invention.

The inner layer serves as a sealant layer and prevents the contents of the tube from coming in contact with the tie or adhesive layer. The inner layer has the same structure as the outer layer or the core layer.

Thus, according to still another embodiment, the dual barrier laminate comprising: an outer polyethylene (PE) layer; a first adhesive layer; a first ethylene vinyl alcohol copolymer (EVOH) barrier layer; a nylon layer; a second ethylene vinyl alcohol copolymer (EVOH) barrier layer; a second adhesive layer; and an inner polyethylene (PE) layer.

In yet another embodiment, the dual barrier laminate, comprising: an external polyethylene (PE) layer; an aluminum layer; an adhesive layer in contact with the said aluminum layer and said external polyethylene (PE) layer; an outer polyethylene (PE) layer; an adhesive layer in contact with the outer polyethylene (PE) layer; a first adhesive layer; a first ethylene vinyl alcohol copolymer (EVOH) barrier layer; a nylon layer; a second ethylene vinyl alcohol copolymer (EVOH) barrier layer; a second adhesive layer; and an inner polyethylene (PE) layer.

Further an embodiment, the dual barrier laminate comprising: an external polyethylene (PE) layer; a first extruded polyethylene (PE) layer; an outer polyethylene (PE) layer; a first adhesive layer; a first ethylene vinyl alcohol copolymer (EVOH) barrier layer; a nylon layer; a second ethylene vinyl alcohol copolymer (EVOH) barrier layer; a second, adhesive layer; an inner polyethylene (PE) layer; a second extruded polyethylene (PE) layer; an internal polyethylene (PE) layer.

In an embodiment, the dual barrier laminate comprising: an external polyethylene (PE) layer having a thickness in the range of 70 microns ($\mu$) to 150 microns ($\mu$); an aluminum layer having a thickness in the range of 9 microns to 25 microns; an adhesive layer in contact with the said aluminum layer having a thickness in the range of 10 microns to 24 microns; an outer polyethylene (PE) layer having a thickness in the range of 15 microns to 25 microns; an adhesive layer in contact with the outer polyethylene (PE) layer having a thickness in the range of 15 microns to 30 microns; a first adhesive layer having a thickness in the range of 7 microns to 15 microns; a first ethylene vinyl alcohol copolymer (EVOH) barrier layer having a thickness in the range of 5 microns to 10 microns; a nylon layer having a thickness in the range of 5 microns to 10 microns; a second ethylene vinyl alcohol copolymer (EVOH) barrier layer having a thickness in the range of 5 microns to 10 microns; a second adhesive layer having a thickness in the range of 7 microns to 15 microns; and an inner polyethylene layer (PE) having a thickness in the range of 15 microns to 25 microns.

In accordance with the present disclosure, the total thickness of the aluminum barrier laminate (ABL) is 163 microns to 339 microns, preferably 290 microns.

In another embodiment, it provides a dual barrier laminate comprising: an external polyethylene (PE) layer having a thickness in the range of 70 microns to 150 microns; a first extruded polyethylene (PE) layer having a thickness in the range of 10 microns to 24 microns; an outer polyethylene (PE) layer having a thickness in the range of 15 microns to 25 microns; a first adhesive layer having a thickness in the range of 7 microns to 15 microns; a first ethylene vinyl alcohol copolymer (EVOH) barrier layer having a thickness in the range of 5 microns to 10 microns; a nylon layer having a thickness in the range of 5 microns to 10 microns; a second ethylene vinyl alcohol copolymer (EVOH) barrier layer having a thickness in the range of 5 microns to 10 microns; a second adhesive layer having a thickness in the range of 7 microns to 15 microns; an inner polyethylene (PE) layer having a thickness in the range of 15 microns to 25 microns; a second extruded polyethylene (PE) layer having a thickness in the range of 10 microns to 24 microns; an internal polyethylene (PE) layer having a thickness in the range of 50 microns to 70 microns.

In accordance with the present disclosure, the total thickness of plastic barrier laminate (PBL) is 199 microns to 328 microns, preferably 290 microns.

In still another embodiment, a packaging tube can be made of the polymer composition. The packaging tube is suitable for aggressive or moisture containing products, such as liniment and/or ointment.

This described multi-layer polymeric laminate structure provides a laminate structure with excellent appearance while still providing the barrier and physical property characteristics needed to successfully maintain freshness of the packaged moisture containing products, such as liniment and/or ointment, and without mottling of the polyamide layer over time.

The inventive multi-layer polymeric laminate structure of the present disclosure is not restricted to the embodiments that are mentioned above in the description.

In one of the embodiment, FIG. 1 illustrates an exemplary structure of the laminate. The laminate structure 100, in FIG. 1, is a seven layer dual barrier layer laminate structure. The dual barrier laminate structure 100, comprising: an outer polyethylene (PE) layer 102, a first adhesive layer 104, a first ethylene vinyl alcohol copolymer (EVOH) barrier layer 106, a nylon layer 108, a second ethylene vinyl alcohol copolymer (EVOH) barrier layer 110, a second adhesive layer 112, and an inner polyethylene (PE) layer 114.

Furthermore, the outer layer also serves as a printing layer. Usually, the outer layer is composed of polyethylene (PE), for example, 90% linear low density polyethylene (LLDPE) and 10% low density polyethylene (LDPE), or any other polymer or copolymer apparent to one having ordinary skill in the art. Material for tie or adhesive layer is selected based on the composition of the outer layer and the next layer. In an exemplary embodiment, the tie or adhesive layer may be a co-extrusion of the low density polyethylene (LDPE) and the ethylene acrylic acid copolymer (EAA) or an anhydride modified polyethylene.

For packaging of pharmaceutical products, such as liniment, a laminate have to protect the contents of the pharmaceutical products against moisture and atmospheric gases and have to preserve the properties of the contents of the pharmaceutical products. To achieve the above mentioned objectives, the laminate can be provided with a barrier layer along with the polymer layers. This barrier layer usually serves as a core layer and is sandwiched between the polymer layers of the laminate. Based on the type of barrier layer used, the laminates are classified into aluminum barrier laminates (ABL) and plastic barrier laminates (PBL). In addition, for the purpose of saving in costs and improvement of quality of the packaging material, the plastic barrier laminates (PBL) are considered over the aluminum barrier laminates (ABL).

Figure 2:
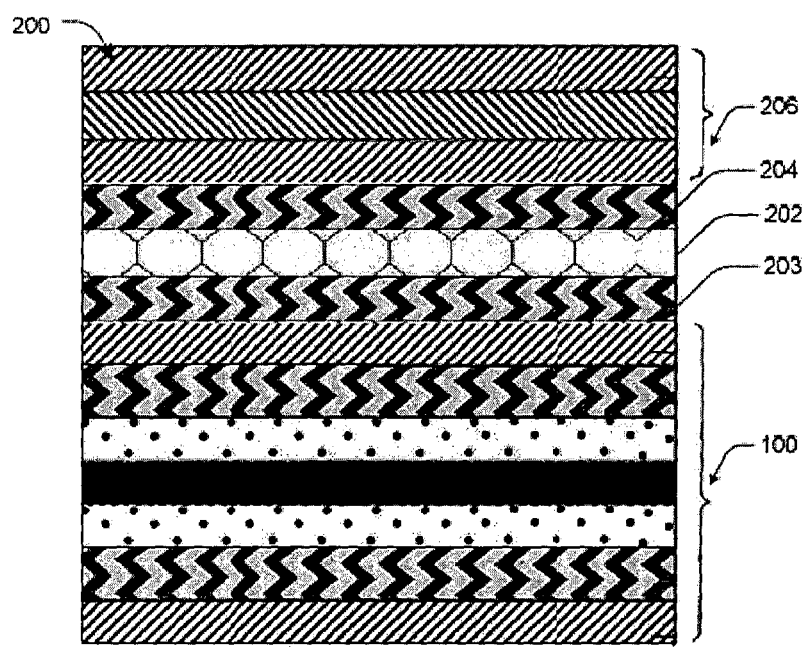
FIG. 2 illustrates a cross-section of a multilayer aluminum barrier laminate (ABL) including the dual barrier laminate structure shown in FIG. 1, in accordance with an exemplary embodiment of the present subject matter.

Further, in case of an aluminum barrier laminate (ABL) 200, as shown in FIG. 2, the dual barrier laminate structure 100 is bound with the outer layer, i.e., the outer polyethylene (PE) layer 102, to a thin aluminum foil 202. The high barrier properties of the dual barrier laminate structure 100 are delivered through the incorporation of the thin aluminum foil 202. The aluminum foil 202 is in turn bound through a tie layer 204 to another polyethylene (PE) layer 206 disposed at external side, and through another tie layer 203 to the dual barrier laminate structure 100. In one embodiment, the polyethylene (PE) layer 206 can be a multi-layer polyethylene (PE).

Figure 3:
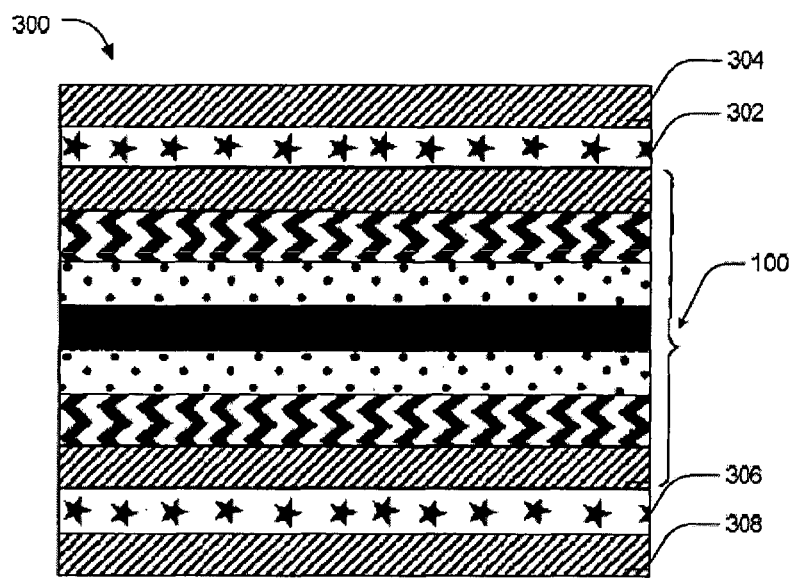
FIG. 3 illustrates a cross-section of a multilayer plastic barrier laminate (PBL) including the dual barrier laminate structure shown in FIG. 1, in accordance with another exemplary embodiment of the present subject matter.

In another embodiment, in case of plastic barrier laminate (PBL) 300, as shown in FIG. 3, a first extruded polyethylene (PE) 302 is sandwiched between the dual barrier laminate structure 100 and the external polyethylene (PE) layer 304; and a second extruded polyethylene (PE) 306 is sandwiched between the dual barrier laminate structure 100 and the internal polyethylene (PE) layer 308.

EXAMPLES

The disclosure will now be illustrated with working examples, which is intended to illustrate the working of the disclosure and not intended to take restrictively to imply any limitations on the scope of the present disclosure. Other embodiments are also possible.

Example 1

An outer polyethylene (PE) layer is in contact with a first adhesive layer. The first adhesive layer binds to a first ethylene vinyl alcohol copolymer (EVOH) barrier layer. The first ethylene vinyl alcohol copolymer (EVOH) barrier layer is in contact with an aliphatic polyamide layer. The aliphatic polyamide layer is in contact with a second ethylene vinyl alcohol (EVOH) polymer barrier film layer. The inner polyethylene (PE) layer is in contact with the above barrier layer.

Example 2

An outer polyethylene (PE) layer of 90% (w/w) linear low density polyethylene (LLDPE) and 10% (w/w) low density polyethylene (LDPE) having a thickness in the range of 15μ to 30μ is in contact with a first adhesive layer. The first adhesive layer having a thickness in the range of 7μ to 15μ binds to a first ethylene vinyl alcohol copolymer (EVOH) barrier layer. The first ethylene vinyl alcohol copolymer (EVOH) barrier layer having a thickness in the range of 5μ to 10μ is in contact with an aliphatic polyamide layer. The aliphatic polyamide layer having a thickness in the range of 5μ to 10μ is in contact with a second ethylene vinyl alcohol copolymer (EVOH) polymer barrier film layer having a thickness in the range of 5μ to 10μ. The second adhesive layer having thickness in the range of 7μ to 15μ binds the second EVOH layer and the inner polyethylene (PE) layer. The inner polyethylene (PE) layer of 90% (w/w) linear low density polyethylene (LLDPE) and 10% (w/w) low density polyethylene (LDPE) having a thickness in the range of 15μ to 25μ is in contact with the above barrier layer.

Example 3

A dual barrier laminate is prepared in the same way as outlined in example 2, having the laminate structure:

An outer polyethylene (PE) layer having a thickness of 20μ// first adhesive layer having a thickness of 10μ// a first ethylene vinyl alcohol copolymer (EVOH) barrier layer having a thickness of 7.5μ// an aliphatic polyamide layer having a thickness of 7.5μ// a second ethylene vinyl alcohol copolymer (EVOH) barrier film layer having a thickness of 7.5μ// a second adhesive layer having a thickness of 10μ// an inner polyethylene (PE) layer having a thickness of 20μ.

Example 4

A laminate is prepared with an external polyethylene (PE) layer in contact with an adhesive layer. The adhesive layer binds to an aluminum layer. The aluminum layer is in contact with another adhesive layer. The said adhesive layer is in contact with a polyethylene layer, which is also referred to as the outer polyethylene layer. This polyethylene (PE) layer is in contact with a first adhesive layer. The first adhesive layer binds to a first ethylene vinyl alcohol copolymer (EVOH) barrier layer. The first ethylene vinyl alcohol copolymer (EVOH) barrier layer is in contact with an aliphatic polyamide layer. The aliphatic polyamide layer is in contact with a second ethylene vinyl alcohol copolymer (EVOH) polymer barrier film layer. The inner polyethylene (PE) layer is in contact with the above barrier layer.

Example 5

An aluminum barrier laminate (ABL) including the dual barrier laminate is prepared in the same way as outlined in example 4, having the laminate structure:

An external polyethylene (PE) layer having a thickness of 100μ// an adhesive layer having a thickness of 15μ// an aluminum layer having a thickness of 15μ// another adhesive layer having a thickness of 22μ// an outer polyethylene (PE) layer a thickness of 20μ// a first adhesive layer a thickness of 10μ// a first ethylene vinyl alcohol copolymer (EVOH) barrier layer having a thickness of 7.5μ// a nylon layer having a thickness of 7.5μ// second ethylene vinyl alcohol copolymer (EVOH) barrier film layer having a thickness of 7.5μ// a second adhesive layer having a thickness of 10μ// an inner polyethylene (PE) layer having a thickness of 20μ.

Example 6

An aluminum barrier laminate (ABL) including the dual barrier laminate is prepared in the same way as outlined in example 4, having the laminate structure:

An external polyethylene (PE) layer having a thickness of 70μ// an adhesive layer having a thickness of 10μ// an aluminum layer having a thickness of 9μ// another adhesive layer having a thickness of 15μ// an outer polyethylene (PE) layer a thickness of 15μ// a first adhesive layer a thickness of 7μ// a first ethylene vinyl alcohol copolymer (EVOH) barrier layer having a thickness of 5μ// a nylon layer having a thickness of 5μ// a second ethylene vinyl alcohol copolymer (EVOH) barrier film layer having a thickness of 5μ// a second adhesive layer having a thickness of 7μ// an inner polyethylene (PE) layer having a thickness of 15μ.

Example 7

An aluminum barrier laminate (ABL) including the dual barrier laminate is prepared in the same way as outlined in example 4, having the laminate structure:

An external polyethylene (PE) layer having a thickness of 150μ// an adhesive layer having a thickness of 24μ// an aluminum layer having a thickness of 25μ// another adhesive layer having a thickness of 30μ// an outer polyethylene (PE) layer a thickness of 25μ// a first adhesive layer a thickness of 15μ// a first ethylene vinyl alcohol copolymer (EVOH) barrier layer having a thickness of 10μ// a nylon layer having a thickness of 10μ// a second ethylene vinyl alcohol copolymer (EVOH) barrier film layer having a thickness of 10μ// a second adhesive layer having a thickness of 15μ// an inner polyethylene (PE) layer having a thickness of 25μ.

Example 8

A laminate is prepared with an external polyethylene (PE) layer is in contact with a first extruded polyethylene layer. The first extruded polyethylene layer binds to an outer polyethylene layer. The outer polyethylene (PE) layer is in contact with a first adhesive layer. The first adhesive layer binds to a first ethylene vinyl alcohol copolymer (EVOH) barrier layer. The first ethylene vinyl alcohol copolymer (EVOH) barrier layer is in contact with an aliphatic polyamide layer. The aliphatic polyamide layer is in contact with a second ethylene vinyl alcohol copolymer (EVOH) polymer barrier film layer. The inner polyethylene (PE) layer is in contact with the above barrier layer. The inner polyethylene layer binds to a second extruded polyethylene layer. An internal polyethylene (PE) layer is in contact with the above second extruded polyethylene layer.

Example 9

A plastic barrier laminate (PBL) including the dual barrier laminate is prepared in the same way as outlined in example 8, having the laminate structure:

An external polyethylene (PE) layer having a thickness of 100μ// a first extruded polyethylene (PE) layer having a thickness of 15μ// an outer polyethylene (PE) layer a thickness of 20μ// a first adhesive layer a thickness of 10μ// a first ethylene vinyl alcohol copolymer (EVOH) barrier layer having a thickness of 7.5μ// all a nylon layer having a thickness of 7.5μ// a second ethylene vinyl alcohol copolymer (EVOH) barrier film layer having a thickness of 7.5μ// a second adhesive layer having a thickness of 10μ// an inner polyethylene (PE) layer having a thickness of 20μ//a second extruded polyethylene (PE) layer having a thickness of 15μ//an internal polyethylene (PE) layer having a thickness of 60μ.

Example 10

A plastic barrier laminate (PBL) including the dual barrier laminate is prepared in the same way as outlined in example 8, having the laminate structure:

An external polyethylene (PE) layer having a thickness of 70μ// a first extruded polyethylene (PE) layer having a thickness of 10μ// an outer polyethylene (PE) layer a thickness of 15μ// a first adhesive layer a thickness of 7μ// a first ethylene vinyl alcohol copolymer (EVOH) barrier layer having a thickness of 5μ// a nylon layer having a thickness of 5μ// a second ethylene vinyl alcohol copolymer (EVOH) barrier film layer having a thickness of 5μ// a second adhesive layer having a thickness of 7μ// an inner polyethylene (PE) layer having a thickness of 15μ//a second extruded polyethylene (PE) layer having a thickness of 10μ//an internal polyethylene (PE) layer having a thickness of 50μ.

Example 11

A plastic barrier laminate (PBL) including the dual barrier laminate is prepared in the same way as outlined in example 8, having the laminate structure:

An external polyethylene (PE) layer having a thickness of 150μ// a first extruded polyethylene (PE) layer having a thickness of 24μ// an outer polyethylene (PE) layer a thickness of 25μ// a first adhesive layer a thickness of 15μ// a first ethylene vinyl alcohol copolymer (EVOH) barrier layer having a thickness of 10μ// a nylon layer having a thickness of 10μ// a second ethylene vinyl alcohol copolymer (EVOH) barrier film layer having a thickness of 10μ// a second adhesive layer having a thickness of 15μ// an inner polyethylene (PE) layer having a thickness of 25μ//a second extruded polyethylene (PE) layer having a thickness of 24μ//an internal polyethylene (PE) layer having a thickness of 70μ.

Although the subject matter has been described in considerable detail with reference to certain preferred embodiments thereof, other embodiments are possible. As such, the spirit and scope of the appended claims should not be limited to the description of the preferred embodiment contained therein.

We claim:

1. A dual barrier laminate comprising:
   (A1) an outer polyethylene layer;
   (A2) a first adhesive layer;
   (A3) a first ethylene vinyl alcohol copolymer (EVOH) barrier layer;
   (B1) an aliphatic polyamide layer;
   (C3) a second ethylene vinyl alcohol copolymer (EVOH) barrier layer;
   (C2) a second adhesive layer; and
   (C1) an inner polyethylene layer;
      wherein said outer and inner polyethylene layers individually comprise from 75% to 95% (w/w) linear low density polyethylene (LLDPE), and 5% to 20% (w/w) low density polyethylene (LDPE).

2. The laminate as recited in claim 1, further comprising:
   (D4) a third adhesive layer;
   (D3) an aluminum layer;
   (D2) a fourth adhesive layer in contact with said aluminum layer; and
   (D1) an external polyethylene layer; wherein said aluminum layer is bound with said third adhesive layer, which is in contact with said outer polyethylene layer.

3. A packaging tube made of the laminate as recited in claim 1.

4. The laminate as recited in claim 1, wherein said outer and/or said inner polyethylene layer is about 90% (w/w) linear low density polyethylene (LLDPE) and about 10% low density polyethylene (LDPE).

5. The laminate as recited in claim 1, wherein said outer polyethylene layer is multi-layered.

6. A packaging tube made of the laminate as recited in claim 5.

7. The laminate as recited in claim 1, wherein said first and/or said second adhesive layer is made up of maleic anhydride modified polyethylene polymer, wherein said polyethylene polymer is selected from ethylene vinyl acetate (EVA)-based or linear low density polyethylene (LLDPE)-based polymer.

8. A packaging tube made of the laminate as recited in claim 7.

9. The laminate as recited in claim 1, wherein the said aliphatic polyamide layer is selected from poly (hexamethylene adipamide), poly (hexamethylene azelaamide), poly (hexamethylene sebacamide), poly (hexamethylene dodecanoamide), poly (dodecamethylene dodecanoamide), and copolymers thereof.

10. A packaging tube made of the laminate as recited in claim 9.

11. The laminate as recited in claim 1, comprising:
(A1) an outer polyethylene layer;
(A2) a first adhesive layer;
(A3) a first ethylene vinyl alcohol copolymer (EVOH) barrier layer;
(B1) a nylon layer;
(C3) a second ethylene vinyl alcohol copolymer (EVOH) barrier layer;
(C2) a second adhesive layer; and
(C1) an inner polyethylene layer.

12. A packaging tube made of the laminate as recited in claim 11.

13. The laminate as recited in claim 1, wherein the said laminate is sandwiched between an outer polyethylene layer comprising a first extruded polyethylene layer, and an inner polyethylene comprising a second extruded polyethylene layer.

14. A packaging tube made of the laminate as recited in claim 13.

15. The laminate as recited in claim 1 comprising:
(D1) an external polyethylene layer;
(A0) a first extruded polyethylene layer;
(A1) an outer polyethylene layer;
(A2) a first adhesive layer;
(A3) a first ethylene vinyl alcohol copolymer (EVOH) barrier layer;
(B1) a nylon layer;
(C3) a second ethylene vinyl alcohol copolymer (EVOH) barrier layer;
(C2) a second adhesive layer;
(C1) an inner polyethylene layer;
(C0) a second extruded polyethylene layer;
(E1) an internal polyethylene layer.

16. A packaging tube made of the laminate as recited in claim 15.

17. A laminate comprising:
(D1) an external polyethylene layer;
(D2) a fourth adhesive layer in contact with an aluminum layer;
(D3) an aluminum foil layer;
(D4) a third adhesive layer in contact with an outer polyethylene layer;
(A1) an outer polyethylene layer;
(A2) a first adhesive layer;
(A3) a first ethylene vinyl alcohol copolymer (EVOH) barrier layer;
(B1) an aliphatic polyamide layer;
(C3) a second ethylene vinyl alcohol copolymer (EVOH) barrier layer;
(C2) a second adhesive layer; and
(C1) an inner polyethylene layer;
wherein said first, said second, said third and fourth adhesive layers comprise a maleic anhydride modified polyethylene polymer, wherein said polyethylene polymer is selected from the group consisting of ethylene vinyl acetate (EVA)-based or linear low density polyethylene (LLDPE)-based polymer; and
wherein the said aliphatic polyamide layer is selected from poly (hexamethylene adipamide), poly (hexamethylene azelaamide), poly (hexamethylene sebacamide), poly (hexamethylene dodecanoamide), poly (dodecamethylene dodecanoamide), and copolymers thereof; and
wherein said external and said inner polyethylene layer is selected from 75% to 95% (w/w) linear low density polyethylene (LLDPE), and 5% to 20% (w/w) low density polyethylene (LDPE).

18. A packaging tube made of the laminate as recited in claim 17.

* * * * *